Feb. 21, 1961 T. O. STANLEY ET AL 2,972,704

VIDEO AMPLIFIER

Filed March 27, 1958 2 Sheets-Sheet 1

INVENTORS
THOMAS O. STANLEY &
ROLAND N. RHODES
BY W. H. Sprouagle
ATTORNEY

INVENTORS
THOMAS O. STANLEY &
ROLAND N. RHODES
BY
[signature]
ATTORNEY 2,972,704

VIDEO AMPLIFIER

Thomas O. Stanley, Princeton, N.J., and Roland N. Rhodes, Levittown, Pa., assignors to Radio Corporation of America, a corporation of Delaware Filed Mar. 27, 1958, Ser. No. 724,450

2 Claims. (Cl. 315—22)

This invention relates to transistor amplifier circuits, and more particularly to wide band (e.g. video frequency) amplifier circuits utilizing transistor amplifying devices.

In designing transistorized signal processing and amplifying circuits capable of handling wide band signals such as used in television, certain problems are encountered. These problems, in some cases, arise from the fact that a transistor is essentially a current operated device while a conventional amplifier tube is a voltage operated device. One of the problems encountered is that of the design of wide band or video frequency amplifiers that have proper amplitude and phase response characteristics and which at the same time are relatively inexpensive and uncomplicated.

It is, therefore, an object of this invention to provide an improved wide band or video frequency amplifier circuit utilizing transistor devices.

It is a further object of this invention to provide a transistor video frequency amplifier circuit having amplitude and phase response characteristics suitable for use with television signals and which may be constructed with a minimum of cost and circuit complication.

In accordance with the invention, a transistor video amplifier circuit includes a signal input circuit to supply wide band or video frequency signals to the input electrode of a transistor device, and a signal output circuit connected to the output electrode of the transistor to supply an amplified video signal to a load circuit. Compensation of the high video frequency response of the amplifier is provided by a peaking circuit connected in series with the output electrode of the transistor. A compensating network is provided to feed back a signal from the load circuit to the input electrode of the transistor to provide further compensation for the amplitude and phase response characteristics of the amplifier.

The invention may be more fully understood when the following detailed description is read with reference to the accompanying drawings, in which.

Figure 1:
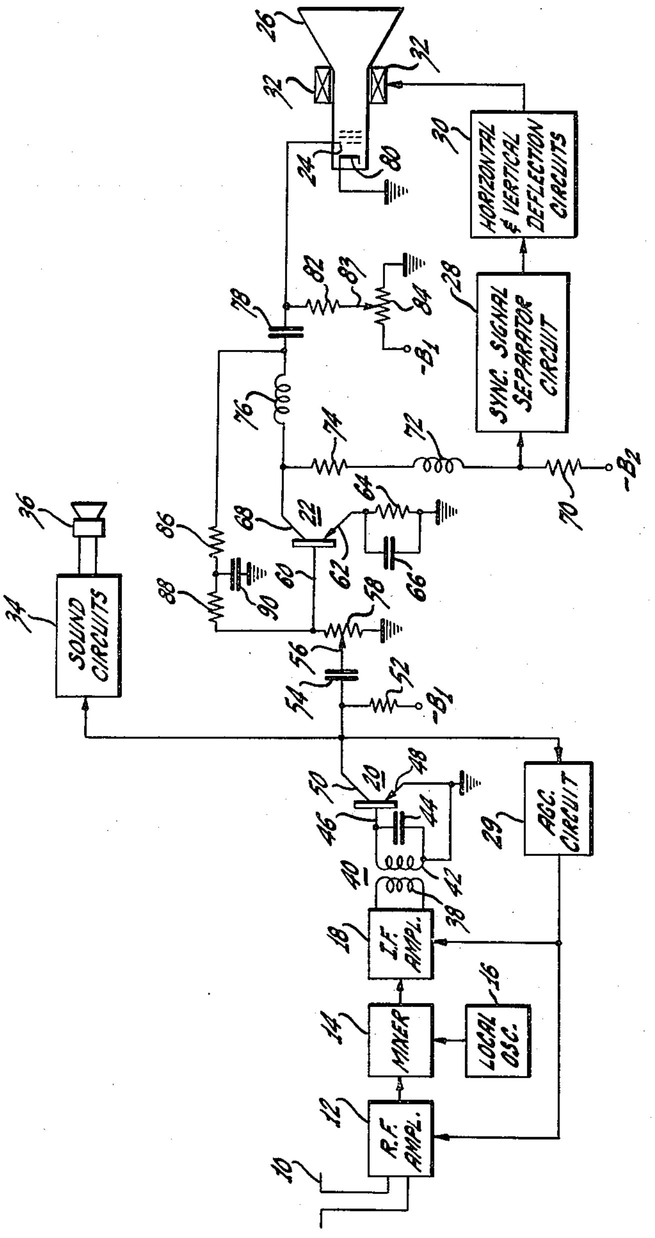
Figure 1 is a schematic diagram of a television receiver having a video amplifier circuit in accordance with the invention.

Referring now to Figure 1, a television receiver includes an antenna 10 to intercept and supply a radio frequency (RF) television signal, including an amplitude modulated RF picture carrier and a frequency modulated RF sound carrier, to an RF amplifier 12 where it is amplified and further applied to a mixer circuit 14. Oscillator signals from a local oscillator 16 are supplied to the mixer 14 to heterodyne the received RF picture and sound carrier signals to intermediate frequency (IF) picture and sound carrier signals, which are applied to, and further amplified in, an IF amplifier 18. The IF picture and sound carrier signals are applied from the IF amplifier 18 to a video detector circuit, which includes the transistor device 20. Detected video signals from the video detector are then applied to a video amplifier circuit, which includes the transistor device 22, and amplified video signals derived from the video amplifier are applied to the control grid 24 of a kinescope 26 which provides an essentially capacitive load circuit for the amplifier.

The synchronizing components of the video signal are supplied from the video amplifier to a synchronizing signal separator circuit 28, where the synchronizing signals are separated and applied to the horizontal and vertical deflection circuits 30 of the receiver, which develop signals to apply to the deflection coils 32 to properly deflect the electron beam of the kinescope 26.

Automatic gain control signals may be derived from the video detector through an AGC circuit 29 and applied to the RF and IF amplifiers 12 and 18 to control the gain of these amplifiers in accordance with the strength of the received signal. The video detector also serves to heterodyne the sound IF and picture IF carriers that are applied thereto (which are spaced, according to present day television standards, 4.5 megacycles apart), and to produce an intercarrier sound signal of 4.5 megacycles frequency modulated by the sound signal, which is applied from the video detector to sound circuits 34. The intercarrier sound signal is amplified and detected in the sound circuits 34 to deliver electrical signals representing the sound to a loudspeaker device 36.

Referring now specifically to the video detector and video amplifier transistors 20 and 22 and their associated circuitry, the picture and sound IF carrier signals are applied from the IF amplifier 18 to the primary winding 38 of a signal input transformer 40 for the detector circuit. The secondary winding 42, which is tuned to the intermediate frequency by a capacitor 44, serves to develop the intermediate frequency signal thereacross and apply it directly to the base electrode 46 of the detector transistor 20. The emitter electrode 48 is connected directly to ground or a point of reference potential for the receiver, and the collector electrode 50 is connected to a first source of operating voltage, $-B_1$, through a load resistor 52. The picture IF carrier signal is detected in the base-to-emitter circuit of the transistor 20 to provide the video signal, including the synchronizing information. Since the detector circuit is the base-to-emitter circuit of the transistor 20, the detected signals are also amplified and developed across the load resistor 52, from which they are applied through a coupling capacitor 54 to a variable tap 56 on a potentiometer 58. The potentiometer 58 serves as a contrast control for the receiver, since the position of the tap 56 on the potentiometer 58 determines the amplitude of signal applied to the video amplifier and hence the amplitude of the output signal of the video amplifier. The video signal, or a portion thereof, that is applied to the potentiometer 58 is further applied directly to the base electrode 60 of the video amplifier transistor 22. The emitter electrode 62 of the transistor 22 is connected to ground for the receiver through a stabilizing resistor 64, which is by-passed for video frequencies by a capacitor 66. The collector electrode 68 is supplied with operating potential from a second source of operating potential, $-B_2$, through a synchronizing signal resistor 70, a choke coil 72, and a second resistor 74, connected in series between $-B_2$ and the collector electrode 68. The synchronizing components of the video signal are developed across the synchronizing signal resistor 70 and applied to the sync signal separator circuit 28.

Amplified video signals available at the collector electrode 68 are applied through a peaking coil or inductor 76 and a coupling capacitor 78 to the control grid 24 of the kinescope 26. The cathode 80 of the kinescope 26 is connected directly to ground for the receiver, and the brightness of the kinescope is controlled by connecting the control grid 24 through a resistor 82 to a variable tap 83 of a potentiometer 84, which, in turn, is connected between the first source of operating potential, $-B_1$, and ground for the receiver.

The video amplifier, as thus far described, is conventional, in that a video input signal applied to the base electrode 60 of the transistor 22 is amplified and applied through a series peaking coil 76 to the control grid 24 of the kinescope 26. With presently available transistors, however, the gain and phase response characteristics of this type of amplifier circuit are not entirely suitable to properly drive a kinescope. In a transistor, a capacitance exists between the input and output electrodes, that is, the collector and base electrodes, when the collector is reverse biased, as in normal operation. At the lower video frequencies the reactance of this capacitance is relatively high and little of the signal that may appear on the collector electrode is fed back to the base electrode. But at the high video frequencies the reactance of the collector-to-base capacitance becomes relatively low and more of the signal that appears on the collector electrode will be fed back to the base electrode. This feedback is detrimental in that it adversely effects the amplitude and phase response characteristics of the amplifier circuit.

In accordance with the invention, the video amplifier may be compensated to provide the required amplitude and phase response by connecting a feedback network between the input base electrode 60 and the end of the peaking coil 76 remote from the collector electrode 68. The feedback circuit shown includes first and second feedback resistors 86 and 88 connected in series between the base electrode 60 and the end of the peaking coil 76 remote from the collector 68, and a phase shifting capacitor 90, whose function will be more fully explained hereinafter, connected from the junction of the feedback resistors 86 and 88 to ground for the receiver to phase delay and attenuate a signal from the load circuit and to apply it to the input electrode 60.

Figure 2:
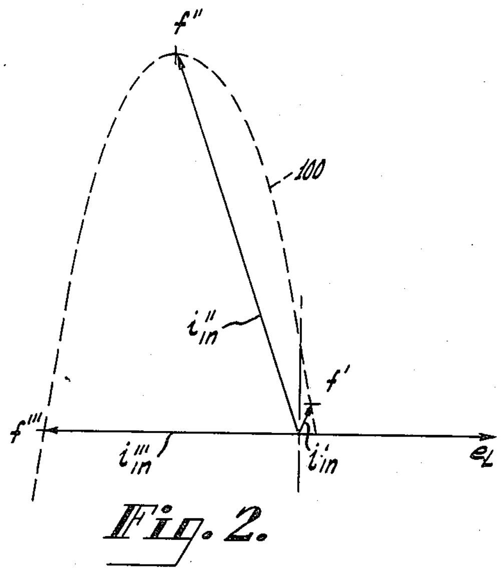
Figure 2 is a vector diagram illustrating certain operational features of an uncompensated amplifier.
Figure 3:
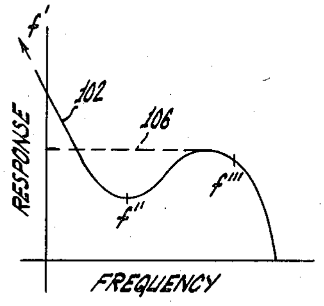
Figure 3 is a graph showing a curve representing the responses of the amplifier circuit, both compensated and uncompensated.

In order to more fully understand the operation of the circuit, reference is made to Figure 2, which is a vector diagram indicating certain relationships that exist in the circuit of an uncompensated amplifier, that is, without the feedback network. The reference vector is taken as $e_L$, which is the voltage across the actual load circuit for the amplifier which appears at the end of the peaking coil 76 remote from the collector electrode 68. The diagram is drawn assuming that the voltage $e_L$ remains constant. The locus of all the vectors representing the input current to the uncompensated amplifier for all frequencies within the band of interest is described by the dotted curve 100. Three points have been selected on the curve 100 to illustrate the operation of the circuit. These points are indicated on the dotted curve 100 as $f'$, $f''$ and $f'''$; $f'$ is a relatively low frequency, $f''$ is a frequency near the middle of the band, and $f'''$ is a frequency near the upper part of the band where the load circuit is series resonant. It will be seen from the vector diagram that, in order to maintain the output voltage $e_L$ constant, the input current must change drastically with frequency if the amplifier is uncompensated. Thus, at frequency $f'$ the input current to deliver $e_L$ is represented by a very small vector, $i'_{in}$, while at $f''$ the input current $i''_{in}$ is represented by a much larger vector, and at the frequency $f'''$ the input current $i'''_{in}$ will be somewhat smaller than at the intermediate frequency $f''$ because of the effect of the series peaking. This variation is caused by feedback through the collector-to-base capacitance of the transistor 22. Thus, the uncompensated amplifier will have a frequency response which is described by the curve 102 in Figure 3, which is a plot of the response of the amplifier against frequency.

In order to maintain the response of the amplifier linear over the frequency range of interest, the feedback network comprising resistors 86 and 88 and capacitor 90 must feed back a signal that will maintain the amplitude of the input current constant to provide a constant $e_L$. The feedback network will provide an input signal to the base electrode having frequency characteristics that are indicated in the vector diagram shown in Figure 4. Again the voltage $e_L$ is taken as a reference and the locus of all currents fed back will be described by the dotted curve 104. The three frequencies $f'$, $f''$ and $f'''$ are noted on the dotted curve 104 and serve to indicate the length and angle of the vectors representing the currents fed back at these frequencies.

Figure 4:
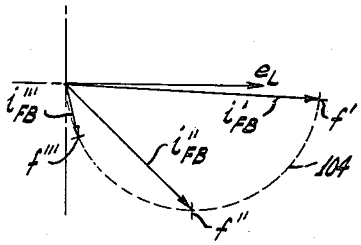
Figure 4 is a vector diagram illustrating certain operational features of the compensating feedback network; and Figures *5a*, *5b* and *5c* are vector diagrams showing certain operational features of a video amplifier embodying the invention.
Figure 5A:
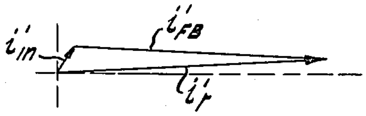
Figure 5B:
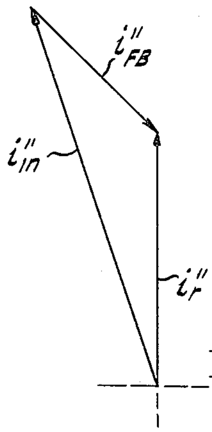
Figure 5C:
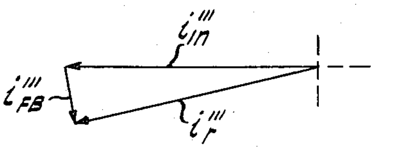

In order to show that the resultant signal applied to the base electrode 60 is relatively constant over the frequency band under consideration, the vector diagrams shown in Figures 5*a*, 5*b* and 5*c* are plotted from the two vector diagrams in Figures 2 and 4. Figure 5*a* indicates the condition at the lowest frequency $f'$. The input signal to the base is $i'_{in}$ from Figure 2 to which is added the feedback signal $i'_{FB}$ from Figure 5*a* which gives a resultant signal to the base of $i'_r$. In Figure 5*b*, $i''_{in}$ is added to $i''_{FB}$ providing a resultant signal of $i''_r$. Lastly, Figure 5*c* shows $i'''_{in}$ to which is added $i'''_{FB}$ to give a resultant of $i'''_r$. It will be noted that the resultant vectors, that is, $i'_r i''_r$ and $i'''_r$, are substantially equal over the band. Thus, the gain and response of the amplifier are constant over the band and the response is represented by the dotted curve 106 of Figure 3.

It will be noted that the gain of the amplifier over the frequency band corresponds to the highest gain of the uncompensated amplifier to high frequencies. Thus, the leveling of the gain does not reduce the high frequency gain of the amplifier but rather increases the mid-range frequency gain up to the high frequency gain.

As an illustrative example, a circuit was constructed and operated utilizing the following components: transistor 22 was a type RCA 2N247 drift transistor; capacitors 54, 66, 90, and 78 were 10 microfarads, 80 microfarads, 3.3 micro-microfarads, and 0.1 microfarad, respectively; resistors 58, 64, 70, 74, 86 and 88 were 5,000 ohms, 330 ohms, 1,000 ohms, 12,000 ohms, 39,000 ohms, and 47,000 ohms, respectively; the peaking coil 76 was a 200–500 microhenry variable inductor; and the choke 72 was a 1,300 microhenry inductor. The first operating voltage, $-B_1$, was $-100$ volts and the second operating voltage, $-B_2$, was $-130$ volts. The gain of the amplifier is sufficient to drive currently available kinescopes. A signal of one milliampere from the video detector applied to the base electrode 60 of the video amplifier transistor 22 produces an output signal of 70 volts, and the amplitude response is flat from the lowest video frequencies to approximately 3 megacycles. The phase shift is sufficiently small to be neglected.

A video amplifier constructed in accordance with the present invention is relatively simple and inexpensive and is characterized by its uniform amplitude and phase response over the band of frequencies to be amplified.

We claim:

1. A video frequency amplifier circuit for a television receiver comprising in combination, a transistor device having base, emitter, and collector electrodes and a collector-to-base capacitance within said device between said collector and base electrodes, means for applying video frequency signals between said base and emitter electrodes, a kinescope having a signal input grid constituting a load circuit for said amplifier, means including a high frequency peaking coil serially connected between said output electrode and said kinescope grid for applying output signals from said collector electrode to the signal input grid of said kinescope, and feedback means for applying a first feedback signal to said base electrode having phase and amplitude characteristics to substantially cancel the effect of a second signal on said base electrode fed back thereto from said collector electrode through the internal capacitance within said transistor, said feedback circuit including a pair of serially connected resistors connected between said base electrode and the end of said peaking coil remote from said collector electrode and capacitance means connected between the junction of said pair of resistors and said emitter electrode.

2. A video frequency amplifier comprising: a transistor having a base, emitter, and collector electrodes and an internal capacitance within said transistor between said base and collector electrodes; a signal input circuit for said transistor connected between said base electrode and a point of reference potential for said amplifier; means for connecting said emitter electrode to said point of reference potential for signal frequencies; a capacitive load circuit for said amplifier; circuit means connected between said collector electrode and said load circuit for applying output signals to said load circuit and including a peaking coil serially connected between said load circuit and said collector electrode to accent high video frequency signals; and feedback circuit means connected between said load circuit and said base electrode for applying a first feedback signal to said base electrode having phase and amplitude characteristics to substantially cancel the effect of a second signal on said base electrode fed back thereto from said collector electrode through the internal capacitance within said transistor, said feedback circuit including a pair of serially connected resistors and a capacitance connected between the junction of said resistors and said point of reference potential.

References Cited in the file of this patent

UNITED STATES PATENTS

| | | |
|---|---|---|
| 1,744,995 | Vawter | Jan. 28, 1930 |
| 1,792,961 | Ballantine | Feb. 17, 1931 |
| 2,170,645 | Peterson | Aug. 22, 1939 |
| 2,269,693 | Schade | Jan. 13, 1942 |
| 2,790,033 | Keiper | Apr. 23, 1957 |

OTHER REFERENCES

Stern et al.: "Internal Feedback and Neutralization of Transistor Amplifiers," Proc. IRE, July 1955, pp. 838–847.

Chu: "Unilateralization of Junction-Transistor Amplifiers at High Frequencies," Proc. IRE, August 1955, pp. 1001–1006.

Lo et al.: Text, "Transistor Electronics," pp. 345–347, published by Prentice-Hall, Inc., September 1955.